(12) United States Patent
Xu et al.

(10) Patent No.: US 10,929,763 B2
(45) Date of Patent: Feb. 23, 2021

(54) RECOMMENDER SYSTEM FOR HETEROGENEOUS LOG PATTERN EDITING OPERATION

(71) Applicant: NEC Laboratories America, Inc., Princeton, NJ (US)

(72) Inventors: Jianwu Xu, Lawrenceville, NJ (US); Biplob Debnath, Princeton, NJ (US); Bo Zong, Plainsboro, NJ (US); Hui Zhang, Princeton Junction, NJ (US); Guofei Jiang, Princeton, NJ (US); Hancheng Ge, College Station, TX (US)

(73) Assignee: NEC CORPORATION

( * ) Notice: Subject to any disclaimer, the term of this patent is extended or adjusted under 35 U.S.C. 154(b) by 850 days.

(21) Appl. No.: 15/684,293

(22) Filed: Aug. 23, 2017

(65) Prior Publication Data
US 2018/0060748 A1    Mar. 1, 2018

Related U.S. Application Data

(60) Provisional application No. 62/379,821, filed on Aug. 26, 2016.

(51) Int. Cl.
*G06N 5/04*    (2006.01)
*G06F 17/16*    (2006.01)
(Continued)

(52) U.S. Cl.
CPC .............. *G06N 5/047* (2013.01); *G06F 17/16* (2013.01); *G06F 40/00* (2020.01); *G06F 40/16* (2020.01); *G06F 40/284* (2020.01); *G06N 7/00* (2013.01)

(58) Field of Classification Search
CPC ........ G06F 40/00; G06F 40/10; G06F 40/284; G06F 40/16; G06F 17/16; G06F 11/14; G06F 1/10
See application file for complete search history.

(56) References Cited

U.S. PATENT DOCUMENTS 8,577,829 B2 *   11/2013   Subrahmanyam ..... G06N 7/005
                                                                706/52
10,061,816 B2 *   8/2018   Convertino ......... G06F 16/2358
(Continued)

FOREIGN PATENT DOCUMENTS

WO    WO-2016093839 A1 *   6/2016   ............. G06F 17/40

OTHER PUBLICATIONS

M. A. Abu-Hashem et al., "Enhancing N-Gram-Hirschberg Algorithm by Using Hash Function," 2009 Third Asia International Conference on Modelling & Simulation, Bali, 2009, pp. 282-286 (Year: 2009).*

(Continued)

*Primary Examiner* — Kakali Chaki
*Assistant Examiner* — Adam C Standke
(74) *Attorney, Agent, or Firm* — Joseph Kolodka

(57) ABSTRACT

A heterogeneous log pattern editing recommendation system and computer-implemented method are provided. The system has a processor configured to identify, from heterogeneous logs, patterns including variable fields and constant fields. The processor is also configured to extract a category feature, a cardinality feature, and a before-after n-gram feature by tokenizing the variable fields in the identified patterns. The processor is additionally configured to generate target similarity scores between target fields to be potentially edited and other fields from among the variable fields in the heterogeneous logs using pattern editing operations based on the extracted category feature, the extracted (Continued)

cardinality feature, and the extracted before-after n-gram feature. The processor is further configured to recommend, to a user, log pattern edits for at least one of the target fields based on the target similarity scores between the target fields in the heterogeneous logs.

18 Claims, 11 Drawing Sheets

(51) Int. Cl.
   *G06N 7/00* (2006.01)
   *G06F 40/00* (2020.01)
   *G06F 40/16* (2020.01)
   *G06F 40/284* (2020.01)

(56) References Cited

U.S. PATENT DOCUMENTS

| | | | | |
|---|---|---|---|---|
| 10,275,496 | B2* | 4/2019 | Brew | G06F 16/24578 |
| 2015/0025875 | A1 | 1/2015 | Perrone | |
| 2015/0094959 | A1 | 4/2015 | Ning et al. | |
| 2016/0124823 | A1* | 5/2016 | Ruan | G06F 11/0709 714/26 |
| 2017/0091190 | A1* | 3/2017 | Attias | G06F 16/215 |
| 2018/0067978 | A1* | 3/2018 | Matsuura | G06F 11/3082 |

OTHER PUBLICATIONS

Kondrak, Grzegorz. "N-gram similarity and distance." International symposium on string processing and information retrieval. Springer, Berlin, Heidelberg, 2005 (Year: 2005).*

Y. Yang et al, "Temporal Data Clustering via Weighted Clustering Ensemble with Different Representations," in IEEE Transactions on Knowledge and Data Engineering, vol. 23, No. 2, pp. 307-320, Feb. 2011 (Year: 2011).*

Sergio Jimenez, Text comparison using soft cardinality Diss., Universidad Nacional de Colombia, Bogotá, D.C., 2015 (Year: 2015).*

Janssens, Saskia. Bell inequalities in cardinality-based similarity measurement. Diss. Ghent University, 2006 (Year: 2006).*

Hassan Saneifar et al., S2MP: similarity measure for sequential patterns. In Proceedings of the 7th Australasian Data Mining Conference—vol. 87. AUS, 95-104.2008 (Year: 2008).*

Islam, Aminul, and Diana Inkpen. "Real-word spelling correction using Google Web 1T n-gram with backoff." 2009 International Conference on Natural Language Processing and Knowledge Engineering. IEEE, 2009. (Year: 2009).*

* cited by examiner

1100

Identify, from the heterogeneous logs, patterns comprising variable fields and constant fields.
1110

Extract a category feature, a cardinality feature, and a before-after n-gram feature by tokenizing the variable fields in the identified patterns.
1120

Generate target similarity scores between target fields to be potentially edited and other fields from among the variable fields in the heterogeneous logs using pattern editing operations based on the extracted category feature, the extracted cardinality feature, and the extracted before-after n-gram feature.
1130

Recommend, to a user, log pattern edits for at least one of the target fields based on the target similarity scores between the target fields in the heterogeneous logs.
1140

FIG. 11

RECOMMENDER SYSTEM FOR HETEROGENEOUS LOG PATTERN EDITING OPERATION

RELATED APPLICATION INFORMATION

This application claims priority to 62/379,821, filed on Aug. 26, 2016, incorporated herein by reference herein its entirety.

BACKGROUND

Technical Field

The present invention relates to heterogeneous information technology (IT) operational logs and more particularly a recommendation framework to automatically provide suggested patterns editing operations for heterogeneous IT operational logs.

Description of the Related Art

Heterogeneous IT operational logs ubiquitously exist in many complex systems such as Internet of Things (IoT), software systems, surveillance systems in smart cities, etc. in which millions of logs are generated every day. These log messages record and indicate the health status of enterprise computer systems. It is infeasible for a human to manually monitor a large number of logs. In recent years, people have leveraged log analytics tools such as next generation log analytics (NGLA) that will automatically parse logs and generate regular expressions (called "patterns") without any prior knowledge and human input. Each pattern contains variable fields and constant fields. Variable fields are substrings which are regular expressions and can be used to parse any testing log to extract the value of that particular substring. Constant fields refer to substrings in the regular expressions that are constant. The patterns are automatically generated by the log analytics tools based on machine intelligence algorithms. Machine generated patterns do not fully meet the requirements of the people monitoring the logs. NGLA users need to modify patterns, delete patterns, and add patterns. Hence, pattern editing tool are essential in order to meet the personal demands of users for better monitoring and understanding of the logs.

SUMMARY

According to an aspect of the present principles, a computer-implemented heterogeneous log pattern editing recommendation method performed in a network having network devices that generate heterogeneous logs is provided. The method includes identifying, by a processor from the heterogeneous logs, patterns comprising variable fields and constant fields. The method also includes extracting, by the processor, a category feature, a cardinality feature, and a before-after n-gram feature by tokenizing the variable fields in the identified patterns. The method additionally includes generating, by the processor, target similarity scores between target fields to be potentially edited and other fields from among the variable fields in the heterogeneous logs using pattern editing operations based on the extracted category feature, the extracted cardinality feature, and the extracted before-after n-gram feature. The method further includes recommending, by the processor to a user, log pattern edits for at least one of the target fields based on the target similarity scores between the target fields in the heterogeneous logs.

According to another aspect of the present principles, a heterogeneous log pattern editing recommendation system deployed in a network having network devices that generate heterogeneous logs is provided. The system includes a server having a processor. The processor is configured to identify, from the heterogeneous logs, patterns comprising variable fields and constant fields. The processor is also configured to extract a category feature, a cardinality feature, and a before-after n-gram feature by tokenizing the variable fields in the identified patterns. The processor is additionally configured to generate target similarity scores between target fields to be potentially edited and other fields from among the variable fields in the heterogeneous logs using pattern editing operations based on the extracted category feature, the extracted cardinality feature, and the extracted before-after n-gram feature. The processor is further configured to recommend, to a user, log pattern edits for at least one of the target fields based on the target similarity scores between the target fields in the heterogeneous logs.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 11 shows a flow diagram illustrating a method performed in a network having network devices, including computers, that generate heterogeneous logs, in accordance with an embodiment of the present invention.

DETAILED DESCRIPTION OF PREFERRED EMBODIMENTS

In practice, the log analytics tools usually generate a large number of patterns from millions of logs produced in the complex systems. It is difficult to modify all patterns, as users are usually capable of only editing a small portion of them in order to meet their demands. A recommendation framework can automatically provide suggested pattern editing operations through all patterns based on existing edits made by users and execute them with the confirmation from users. The recommendation framework can also be configured to automatically execute the pattern editing operations.

The recommendation framework builds a recommendation system on pattern editing on the log analytics tools such as NGLA. There are six editing operations including two variable-level operations RENAME and SPECIALIZATION, two constant-level operations MERGE and GENERALIZATION and two pattern-level operations ADD and DELETION.

For the variable-level operations, the system extracts three features from log patterns generated by the log analytics tools including category, cardinality, and before-after n-grams. For each of the features, the similarity matrix between variable fields in the pattern is calculated based upon methods such as edit distance. All these similarity matrices would be merged into a field network where the recommendation on variable-level operations is conducted.

There are two approaches for MERGE and GENERALIZATION, respectively. For the constant-level operation MERGE, the system would match the first token in the consecutive fields the user wants to merge to tokens in other patterns. Once this matching is found, the merge similarity score would be generated by calculating the edit distance between the consecutive fields the user specified and the corresponding fields in other patterns. The system would recommend consecutive fields in other patterns based on merge similarity scores with the consecutive fields the user specified. For the constant-level operation GENERALIZATION, the system would extract the before-after n-grams of the constant fields in other patterns that are the same constant field the user wants to generalize, and then compute the before-after similarity score by calculating the edit distance between constant fields with the before-after n-grams.

For the pattern-level operation DELETION, the system would first split patterns to tokens and check if types of tokens at the same positions in a pair of patterns, respectively, are the same. Then the recommender system will calculate the similarity score between any two patterns based on the criterion. The similarity score between two patterns would be calculated by dividing the final count by the maximum number of tokens in these two patterns. Finally, the system would perform recommendations of patterns based on these similarity scores.

Figure 1:
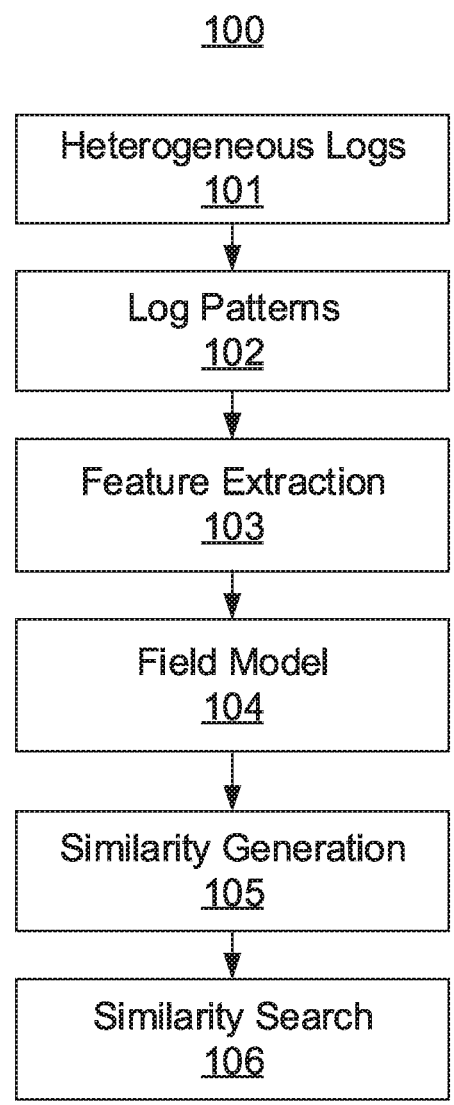
FIG. 1 shows a flow diagram illustrating a heterogenous log pattern editing recommendation system, in accordance with an embodiment of the present invention.

Referring now in detail to the figures in which like numerals represent the same or similar elements and initially to FIG. 1, a heterogenous log pattern editing recommendation system 100 is illustratively shown.

In one embodiment, the heterogenous log pattern editing recommendation system 100 can include heterogeneous logs 101. The heterogeneous logs 101 are taken from arbitrary/unknown systems or applications. The heterogeneous logs 101 contain unstructured text content with one or more fields. The heterogeneous logs 101 may also contain timestamps. The heterogeneous logs 101 can be passed into the log patterns 102.

The log patterns 102 uses log analytics tools to automatically generate regular expression patterns from the heterogeneous logs 101 by unsupervised learning methods. Each of logs is associated with a pattern. The log patterns 102 can be passed into the feature extraction 103.

The feature extraction 103 extracts three features from patterns automatically generated from the log patterns 102, which include Category, Cardinality and Before-After N-grams. The feature extraction 103 begins with tokenized patterns and extracts corresponding features for variable-fields in all heterogeneous logs. Each of the variable-field in the log pattern is stored in a field model 104 that has various attributes including category, cardinality, frequency map of values, etc. per log pattern. The field model 104 can be passed into the similarity generation 105.

The similarity generation 105 produces a target similarity score between the target fields a user wants to edit and all other fields in the patterns as calculated for various pattern editing operations. For the variable-level operations, a combined similarity matrix is generated based upon features generated from the feature extraction 103. For the constant-level operations, corresponding procedures are applied to obtain similar constant fields in each of the other patterns by computing the similarities with the constant fields specified by a user. For the pattern-level operations, the pattern similarity matrix between patterns is generated by investigating the number of tokens with the same types between two patterns following the sequential order. The target similarity scores can be passed into the similarity search 106.

The similarity search 106 searches fields in the patterns which are similar with ones a user intends to edit according to similarities generated from the similarity generation 105 for various pattern editing operations. All similar fields are sorted based upon their target similarity scores and further recommended back to the users.

Figure 2:
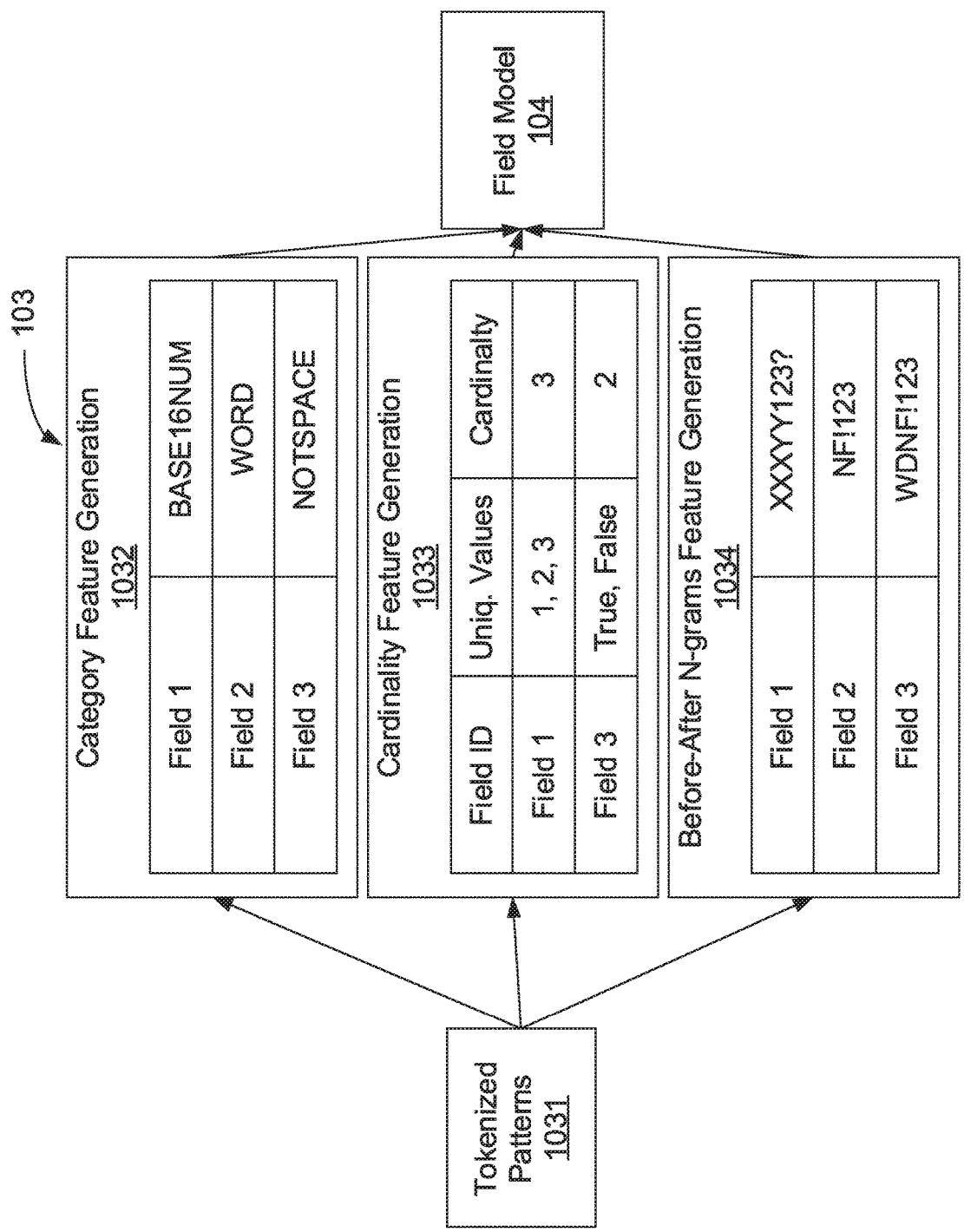
FIG. 2 further shows the feature extraction block of FIG. 1, in accordance with an embodiment of the present invention.

FIG. 2 further shows the feature extraction block 103 of FIG. 1, in accordance with an embodiment of the present invention.

A log pattern consists of variable-fields and constant-fields. The feature extraction 103 focuses on extracting features for variable-fields in the patterns generated from the log patterns 102 using tokenized patterns 1031. Three features are extracted in this step including a category, a cardinality, and a before-after n-grams.

The tokenized patterns 1031 are generated by taking arbitrary log patterns from the log patterns 102. The tokenization is processed in order to generate semantically meaningful tokens from patterns. Each pattern is split based on a delimiter (e.g., space, comma, etc.). The tokenized patterns 1031 can be passed into the category feature generation 1032, the cardinality feature generation 1033, and the before-after n-grams feature generation 1034.

The category feature generation 1032 looks across all heterogeneous logs, assigning one of five different categories to each of variable-fields in the patterns. The five categories are BASE16NUM (pure or only numbers), NOT-SPACE (characters except for space or only non-space characters), IP_HLA (internet protocol (IP) address), WORD (pure or only letters) and HLA_TS1 (date/time). The assigned categories can be passed into the field model 104.

A field in the pattern is associated with unique values from heterogeneous logs. The cardinality feature generation 1033 is defined as the number of unique values in a field. The cardinality feature generation 1033 can be passed into the field model 104.

Figure 3:
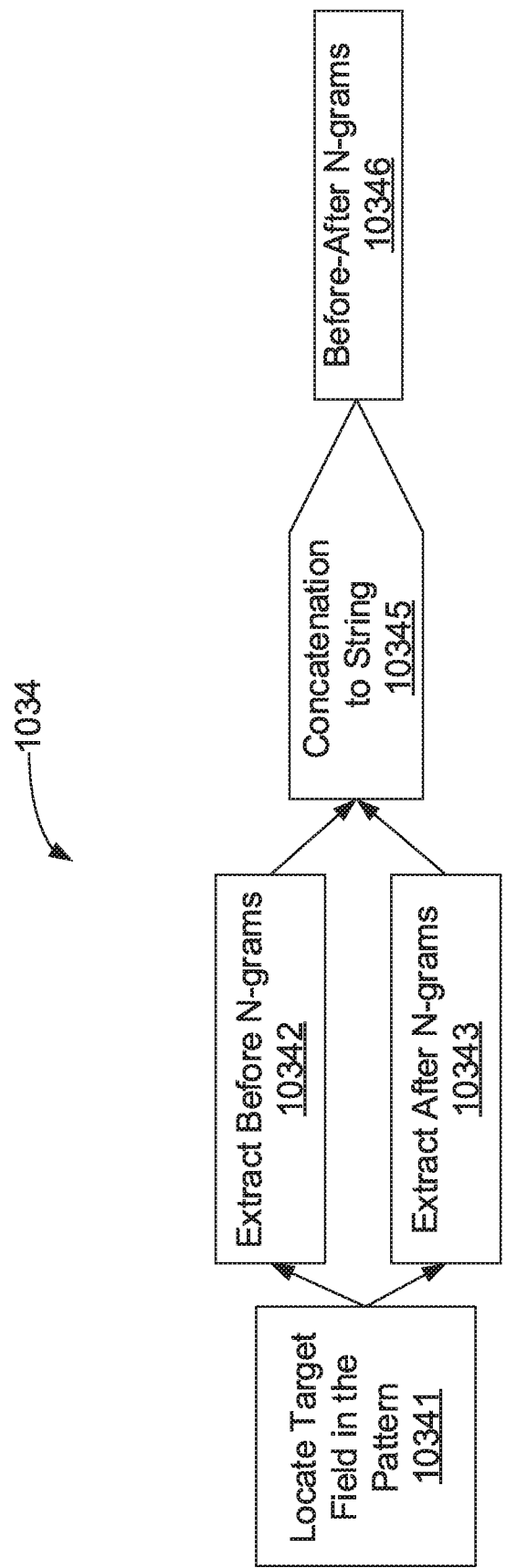
FIG. 3 further shows the before-after n-grams feature generation block of FIG. 2, in accordance with an embodiment of the present invention.

FIG. 3 further shows the before-after n-grams feature generation block 1034 of FIG. 2, in accordance with an embodiment of the present invention.

The before-after n-grams feature generation 1034 are n-gram features based on Natural Language Processing (NLP) techniques. The pattern containing the target field is tokenized by splitting based on a delimiter (e.g., space, comma, etc.). After locating the target field 10341, the before n-grams 10342 and the after n-grams 10343 are extracted with n tokens before the target field and n tokens after it, respectively. After concatenating all extracted 2n tokens into a whole string 10345 following the sequential order, which is the before-after n-grams feature 10346 of the target field. The before-after n-grams feature 10346 can be passed into the field model 104.

Figure 4:
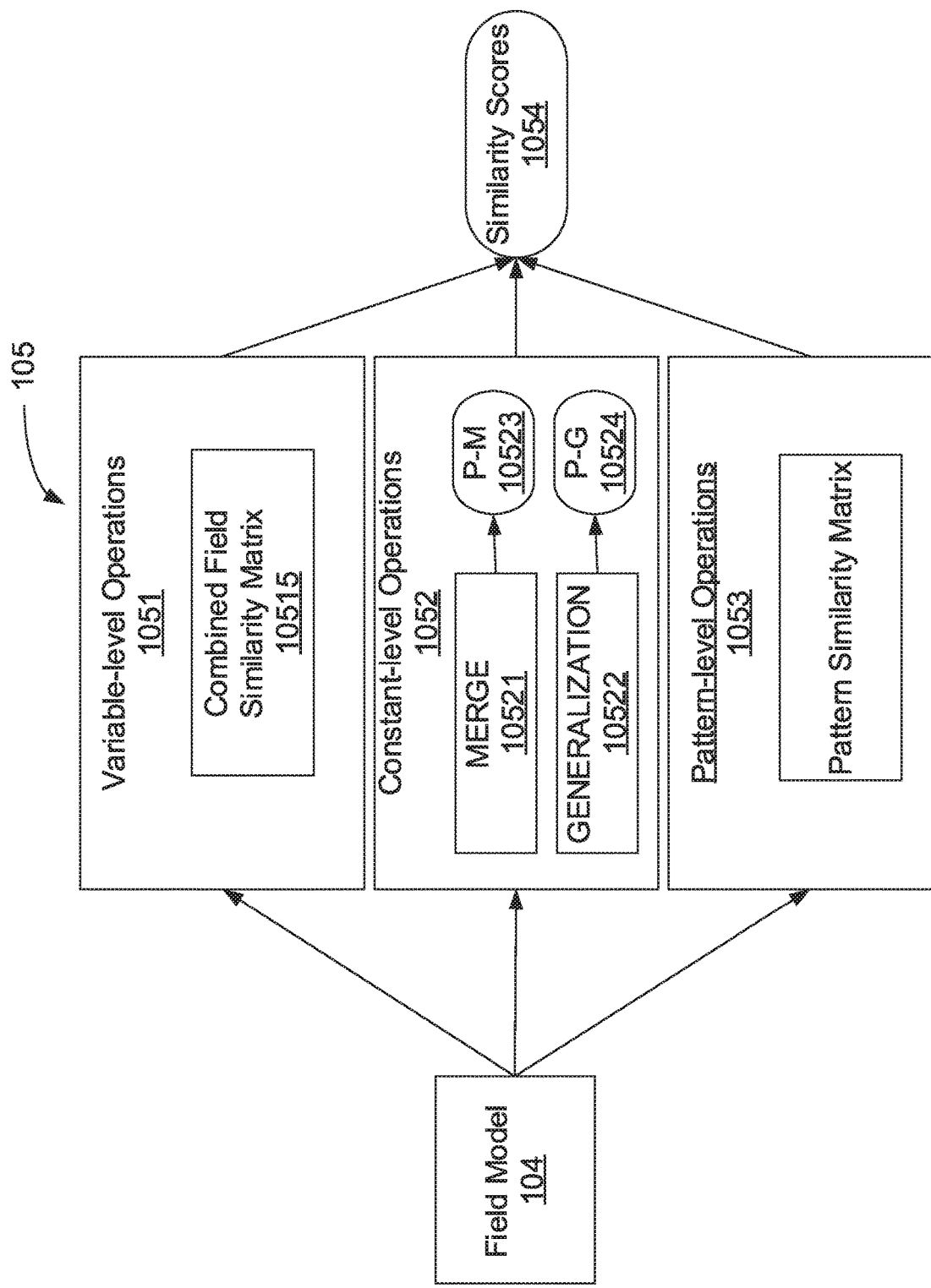
FIG. 4 further shows the similarity generation block of FIG. 1, in accordance with an embodiment of the present invention.

FIG. 4 further shows the similarity generation block 105 of FIG. 1, in accordance with an embodiment of the present invention.

The similarity generation 105 is a component of the heterogenous log pattern editing recommendation system 101. In terms of various kinds of editing operations, the corresponding similarity scores are calculated between the target fields a user wants to edit and all other fields in the patterns. Four key components in the similarity generation 105 are variable-level operations 1051, constant-level operations 1052, pattern-level operations 1053, and similarity scores 1054.

Figure 5:
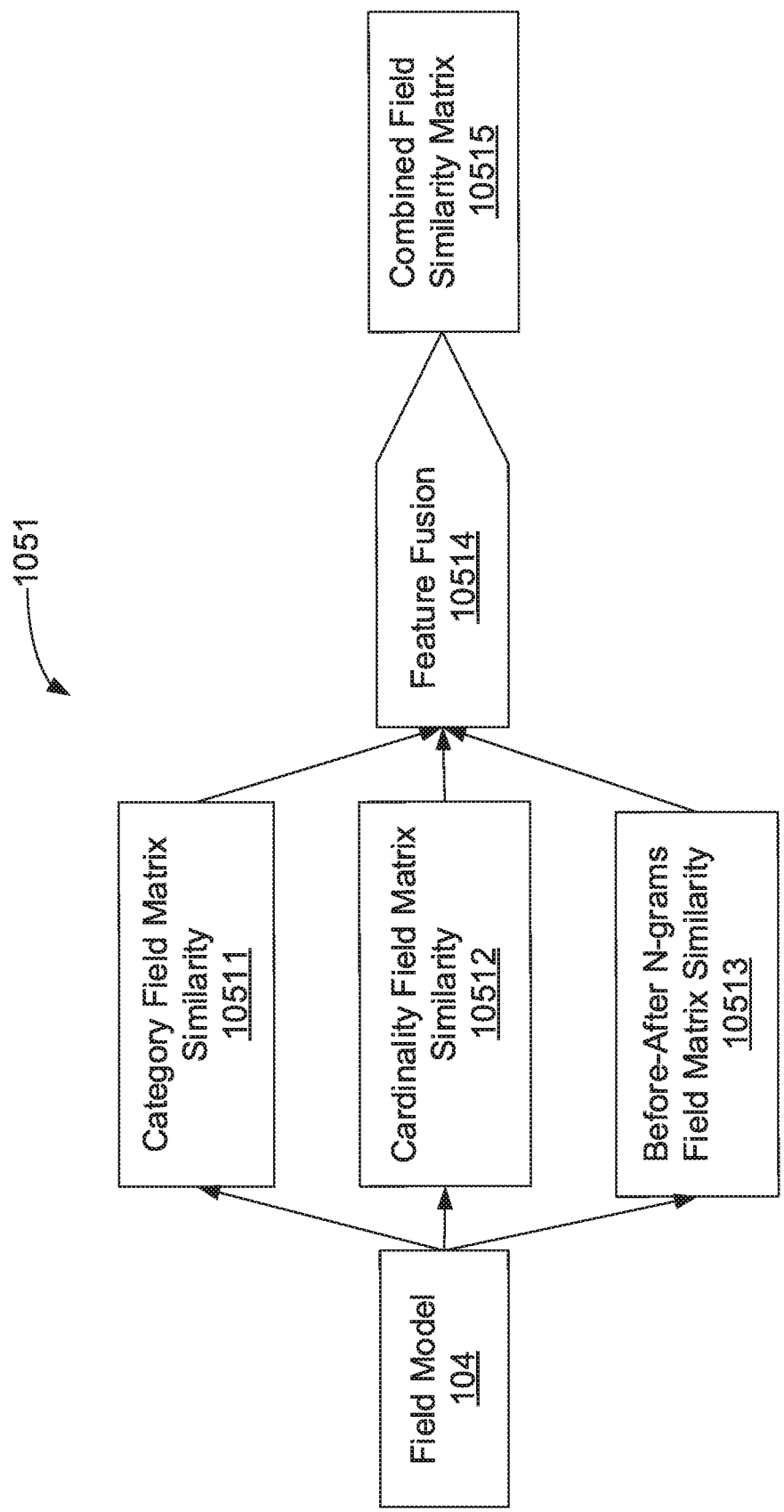
FIG. 5 further shows the variable-level operations block of FIG. 4, in accordance with an embodiment of the present invention.

FIG. 5 further shows the variable-level operations block 1051 of FIG. 4, in accordance with an embodiment of the present invention.

The variable-level operations 1051 computes a combined field similarity matrix 10515 between all variable-fields by fusing 10514 a category field matrix similarity 10511, a cardinality field matrix similarity 10512, and a before-after n-gram field matrix similarity 10513, all extracted from the field model 104. For the category field matrix similarity 10511, the category similarity score between a pair of fields will be 1 if they have the same category, otherwise, 0. For the cardinality field matrix similarity 10512, the cardinality similarity score between two fields is calculated as 1 minus the normalized difference of cardinalities between these two fields. For the before-after n-gram field matrix similarity 10513, the before-after similarity score between two fields is computed as 1 minus the edit distance between their before-after n-grams features. A combined field similarity matrix 10515 is generated by fusing 10514 the three similarity matrices introduced above with a formula as follows:

$$\Theta_{comb} = \Theta_{category} \odot (\alpha * \Theta_{cardinality} + (1-\alpha) * \Theta_{before\text{-}after\text{-}n\text{-}grams}),$$

where $\Theta$ is denoted as the similarity matrix for fields in the patterns, $\alpha$ is a contribution parameter using to balance the weights of similarity matrices generated from cardinality and before-after n-grams, and ● is the element-wise matrix multiplication.

The constant-level operations 1052 focuses on finding similar fields (consecutive fields or constant-fields) based on fields the user specified in the patterns edits associated with two constant-level operations MERGE 10521 and GENERALIZATION 10522 for which two procedures (denoted as P-M 10523 and P-G 10524) are generated. For the constant-level operation MERGE 10521, the consecutive fields specified by the user is first tokenized as well as all patterns extracted from the log patterns 102. Iteratively going through each of tokenized patterns, the merge similarity score will be calculated between consecutive fields the user wants to merge and ones in the pattern by applying the edit distance while the first token from consecutive fields specified by the user is found in this pattern. For the constant-level operation GENERALIZATION 10522, a similar procedure is conducted as MERGE 10521 except that the before-after n-grams will be extracted once the target constant specified by the user is found in a pattern. Afterwards, a generalization similarity score is calculated by using 1 to subtract the edit distance normalized by dividing the maximum number of characters between these two constants based upon their before-after n-gram features.

The pattern-level operations 1053 calculates a pattern similarity matrix between patterns by checking if types of tokens with the same position in a pair of patterns are the same or not. Concretely, all patterns are tokenized as stated in the tokenized patterns 1031. Following the sequential order, all tokens in the target pattern specified by the user are tested if they have the same type with tokens in the same positions in one of other patterns. a pattern similarity score between two patterns is calculated by the total number of pairs of tokens with the same types from these two patterns.

The similarity scores 1054 is a combination of the combined field similarity matrix 10515, the merge similarity score, the generalization similarity score, and the pattern similarity score. The similarity score 1054 is used in the similarity search 106.

Figure 6:
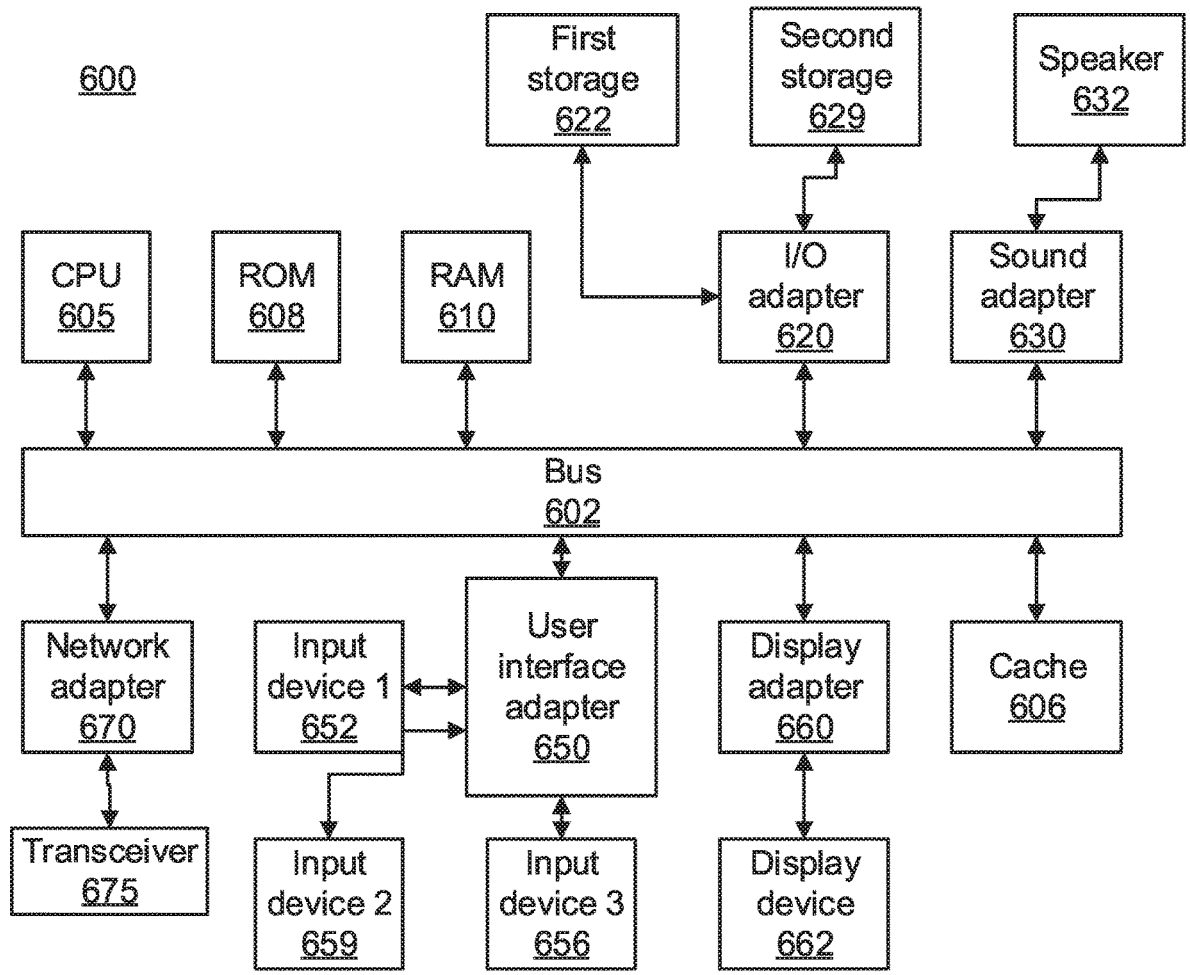
FIG. 6 shows a block diagram illustrating a computer processing system, in accordance with an embodiment of the present invention.

Referring to FIG. 6, an exemplary computer system 600 is shown which may represent a server or a network device, in accordance with an embodiment of the present invention. The computer system 600 includes at least one processor (CPU) 605 operatively coupled to other components via a system bus 602. A cache 606, a Read Only Memory (ROM) 608, a Random Access Memory (RAM) 610, an input/output (I/O) adapter 620, a sound adapter 630, a network adapter 670, a user interface adapter 650, and a display adapter 660, are operatively coupled to the system bus 602.

A first storage device 622 and a second storage device 629 are operatively coupled to system bus 602 by the I/O adapter 620. The storage devices 622 and 629 can be any of a disk storage device (e.g., a magnetic or optical disk storage device), a solid state magnetic device, and so forth. The storage devices 622 and 629 can be the same type of storage device or different types of storage devices.

A speaker 632 may be operatively coupled to system bus 602 by the sound adapter 630. A transceiver 675 is operatively coupled to system bus 602 by network adapter 670. A display device 662 is operatively coupled to system bus 602 by display adapter 660.

A first user input device 652, a second user input device 659, and a third user input device 656 are operatively coupled to system bus 602 by user interface adapter 650. The user input devices 652, 659, and 656 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 652, 659, and 656 can be the same type of user input device or different types of user input devices. The user input devices 652, 659, and 656 are used to input and output information to and from system 600.

Of course, the computer system 600 may also include other elements (not shown), as readily contemplated by one of skill in the art, as well as omit certain elements. For example, various other input devices and/or output devices can be included in computer system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 600 are readily contemplated by one of ordinary skill in the art given the teachings of the present invention provided herein.

Moreover, it is to be appreciated that environment 700, environment 800, environment 900, and environment 1000 described below with respect to FIG. 7, FIG. 8, FIG. 9, and FIG. 10 are environments for implementing respective embodiments of the present invention. Part or all of processing system 600 may be implemented in one or more of the elements of environment 700 and/or one or more of the elements of environment 800 and/or one or more of the elements of environment 900 and/or one or more of the elements of environment 1000.

Further, it is to be appreciated that processing system 600 may perform at least part of the method described herein including, for example, at least part of system 100 of FIG. 1 and/or at least part of method 1100 of FIG. 11. Similarly, part or all of system 710 and/or system 801 and/or system 1010 may be used to perform at least part of the functions implicated by one or more elements of system 100 of FIG. 1 and/or at least part of method 1100 of FIG. 11.

Figure 7:
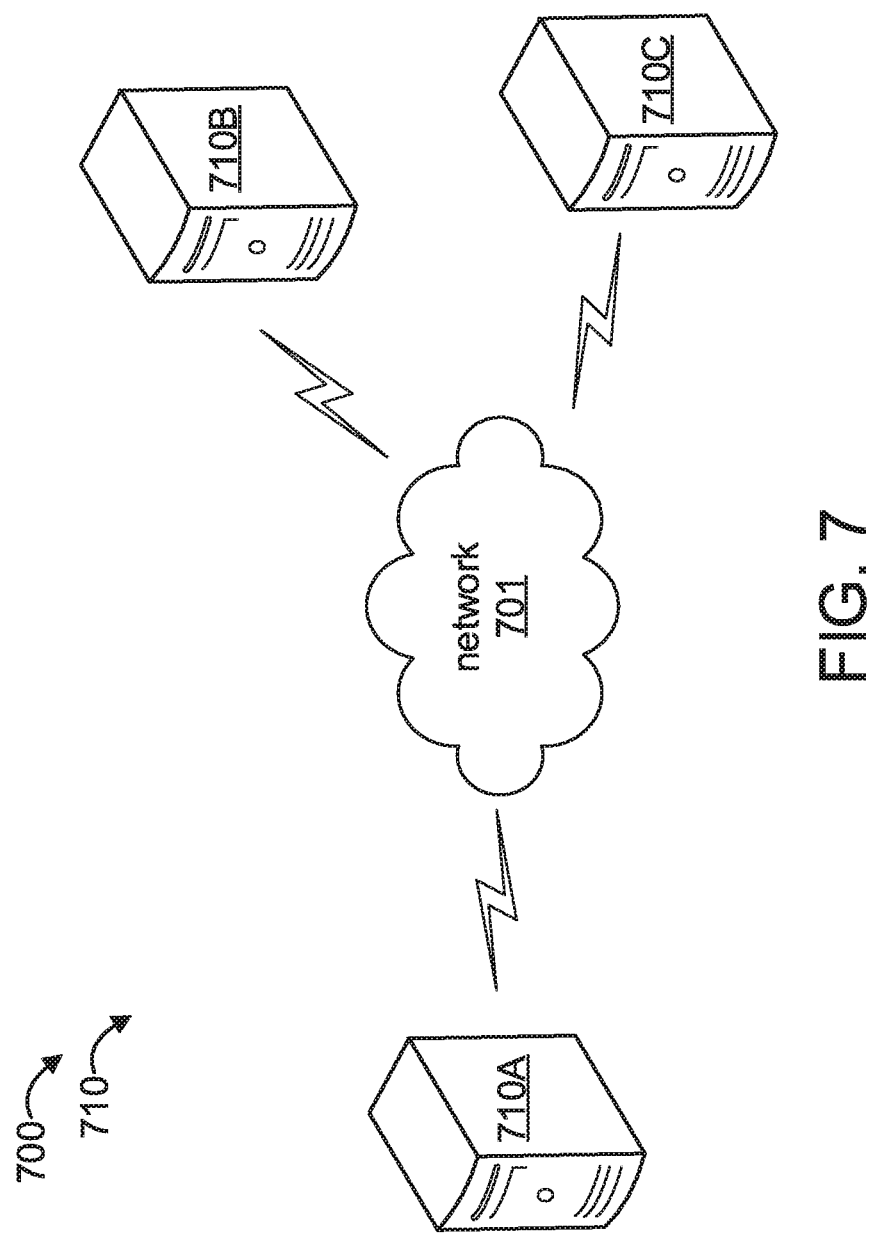
FIG. 7 shows a block diagram of an exemplary environment to which the present invention can be applied, in accordance with an embodiment of the present invention.

FIG. 7 shows an exemplary environment 700 to which the present invention can be applied, in accordance with an embodiment of the present invention. The environment 700 is representative of a computer network to which the present invention can be applied. The elements shown relative to FIG. 7 are set forth for the sake of illustration. However, it is to be appreciated that the present invention can be applied to other network configurations as readily contemplated by one of ordinary skill in the art given the teachings of the present invention provided herein, while maintaining the spirit of the present invention.

The environment 700 at least includes a set of computer processing systems 710. The computer processing systems 710 can be any type of computer processing system including, but not limited to, servers, desktops, laptops, tablets, smart phones, media playback devices, and so forth. For the sake of illustration, the computer processing systems 710 include server 710A, server 710B, and server 710C.

In an embodiment, the present invention collects or receives heterogeneous logs from other systems on the computer processing systems 710. Thus, any of the computer processing systems 710 can analyze the heterogeneous logs and be the heterogenous log pattern editing recommendation system 100. Moreover, the recommendations of the present invention can be sent to other systems on the network or used to control other systems and/or devices and/or operations and/or so forth, as readily appreciated by one of ordinary skill in the art given the teachings of the present invention provided herein, while maintaining the spirit of the present invention.

In the embodiment shown in FIG. 7, the elements thereof are interconnected by a network(s) 701. However, in other embodiments, other types of connections can also be used. Additionally, one or more elements in FIG. 7 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 700 are readily determined by one of ordinary skill in the art, given the teachings of the present invention provided herein, while maintaining the spirit of the present invention.

Figure 8:
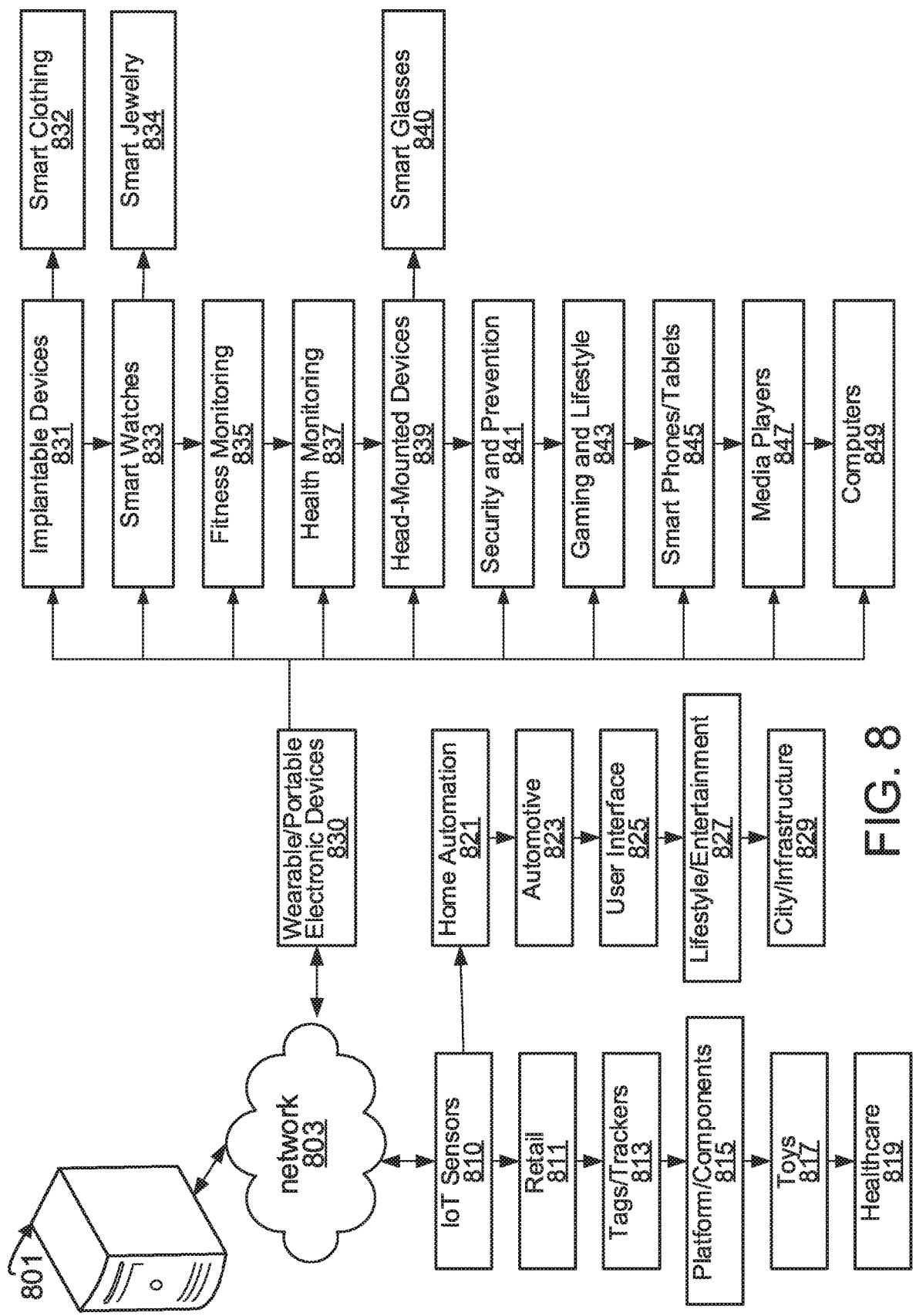
FIG. 8 is a block diagram of an exemplary environment to which the present invention can be applied, in accordance with embodiments of the present invention.

FIG. 8 shows an exemplary environment 800 to which the present invention can be applied, in accordance with an embodiment of the present invention.

IoT (Internet of Things) is an advanced automation and analytics system which exploits networking, sensing, big data, and artificial intelligence technology to deliver complete systems for a product or service. These systems allow greater transparency, control, and performance when applied to any industry or system.

IoT systems have applications across industries through their unique flexibility and ability to be suitable in any environment. They enhance data collection, automation, operations, and much more through smart devices and powerful enabling technology.

IoT systems allow users to achieve deeper automation, analysis, and integration within a system. They improve the reach of these areas and their accuracy. IoT utilizes existing and emerging technology for sensing, networking, and robotics. Features of IoT include artificial intelligence, connectivity, sensors, active engagement, and small device use.

In various embodiments, the heterogenous log pattern editing recommendation system 100 can be used to analyze heterogenous logs from IoT systems and recommend edits to the patterns for easier use, understanding, and better management of the IoT systems. The heterogenous logs can be received by a computer processing systems 801 via a network 803. For example, the computer processing systems 801 can receive heterogeneous logs from wearable or portable electronic devices 830. Wearable/portable electronic devices 830 can include implantable devices 831, such as smart clothing 832. Wearable/portable devices 830 can include smart watches 833, as well as smart jewelry 834. Wearable/portable devices 830 can further include fitness monitoring devices 835, health and wellness monitoring devices 837, head-mounted devices 839 (e.g., smart glasses 840), security and prevention systems 841, gaming and lifestyle devices 843, smart phones/tablets 845, media players 847, and/or computers/computing devices 849.

The computer processing systems 801 can also receive heterogeneous logs from sensors 810 for various applications, such as home automation 821, automotive 823, user interface 825, lifestyle and/or entertainment 827, city and/or infrastructure 829, retail 811, tags and/or trackers 813, platform and components 815, toys 817, and/or healthcare 819. The IoT sensors 810 can communicate with the computer processing systems 801 via network 803. Of course, one skilled in the art can contemplate using the computer processing systems 801 to receive heterogeneous logs other types of applications, not limited to the ones described herein.

Figure 9:
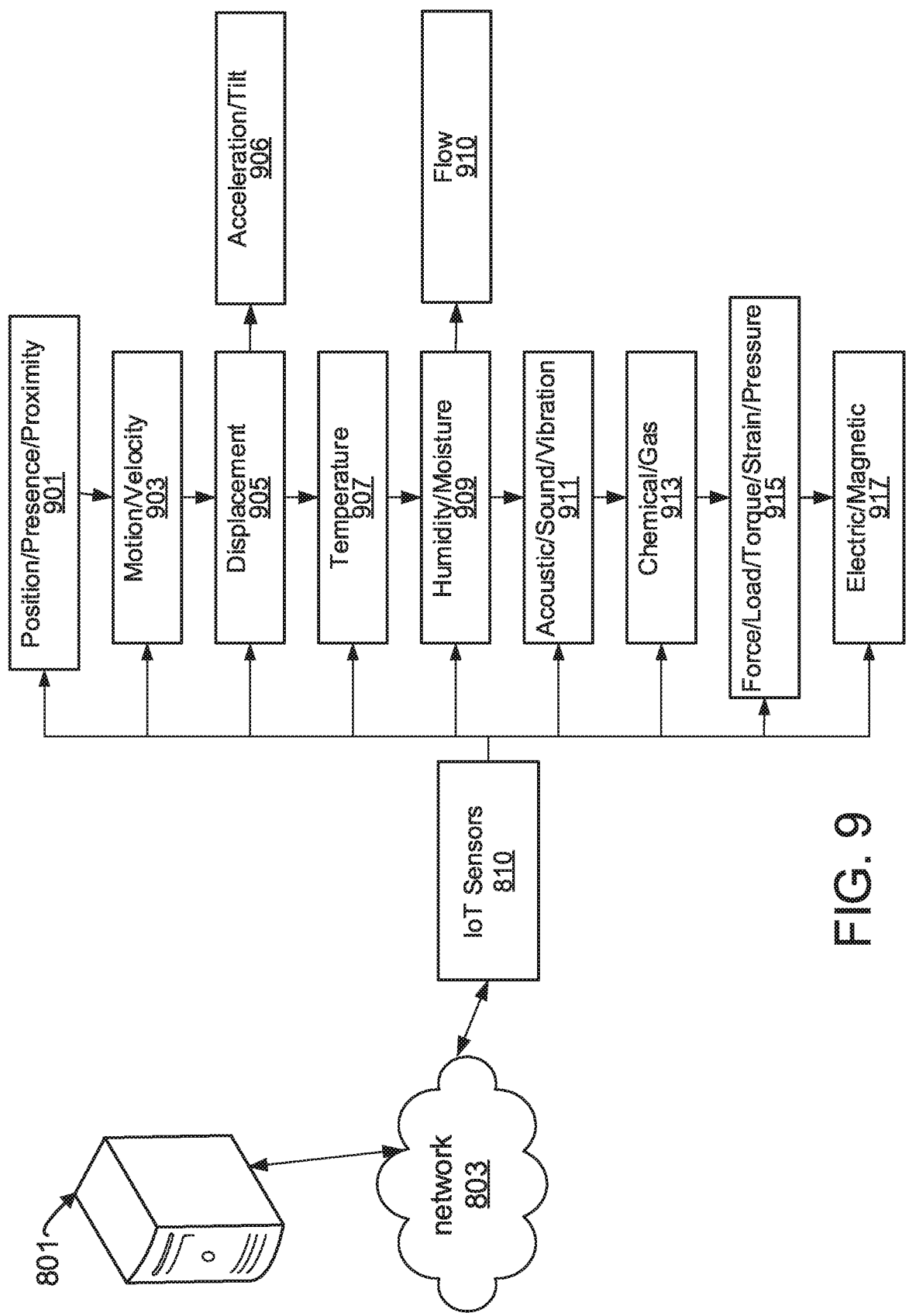
FIG. 9 is block diagram of an exemplary environment to which the present invention can be applied, in accordance with embodiments of the present invention.

FIG. 9 shows an exemplary environment 900 to which the present invention can be applied, in accordance with an embodiment of the present invention.

IoT loses its distinction without sensors. IoT sensors act as defining instruments which transform IoT from a standard passive network of devices into an active system capable of real-world integration.

The IoT sensors 810 can be connected via network 803 to transmit information/data, continuously and in in real-time, to the computer processing systems 801, which includes the heterogenous log pattern editing recommendation system 100. Exemplary IoT sensors 810 can include, but are not limited to, position/presence/proximity sensors 901, motion/velocity sensors 903, displacement sensors 905, such as acceleration/tilt sensors 906, temperature sensors 907, humidity/moisture sensors 909, as well as flow sensors 910, acoustic/sound/vibration sensors 911, chemical/gas sensors 913, force/load/torque/strain/pressure sensors 915, and/or electric/magnetic sensors 917. One skilled in the art can contemplate using any combination of such sensors to collect heterogeneous logs to be analyzed by the heterogenous log pattern editing recommendation system 100. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

Moreover data collection software can be used to manage sensing, measurements, light data filtering, light data security, and aggregation of data. Data collection software uses certain protocols to aid IoT sensors in connecting with real-time, machine-to-machine networks (e.g., that send heterogeneous logs to the heterogenous log pattern editing recommendation system 100). Then the data collection software collects data from multiple devices and distributes it in accordance with settings. Data collection software also works in reverse by distributing data over devices. The system can eventually transmit all collected data to, e.g., a central server.

Additionally, real-time analytics applications take data or input from various devices and convert it into viable actions or clear patterns for human analysis. They analyze information based on various settings and designs in order to perform automation-related tasks or provide the data required by industry. In the instant case, real-time analytics applications can aid the current system in sending log messages, analyzing log messages, parsing log messages, and using the heterogenous log pattern editing recommendation system 100, as well as detecting anomalies.

Figure 10:
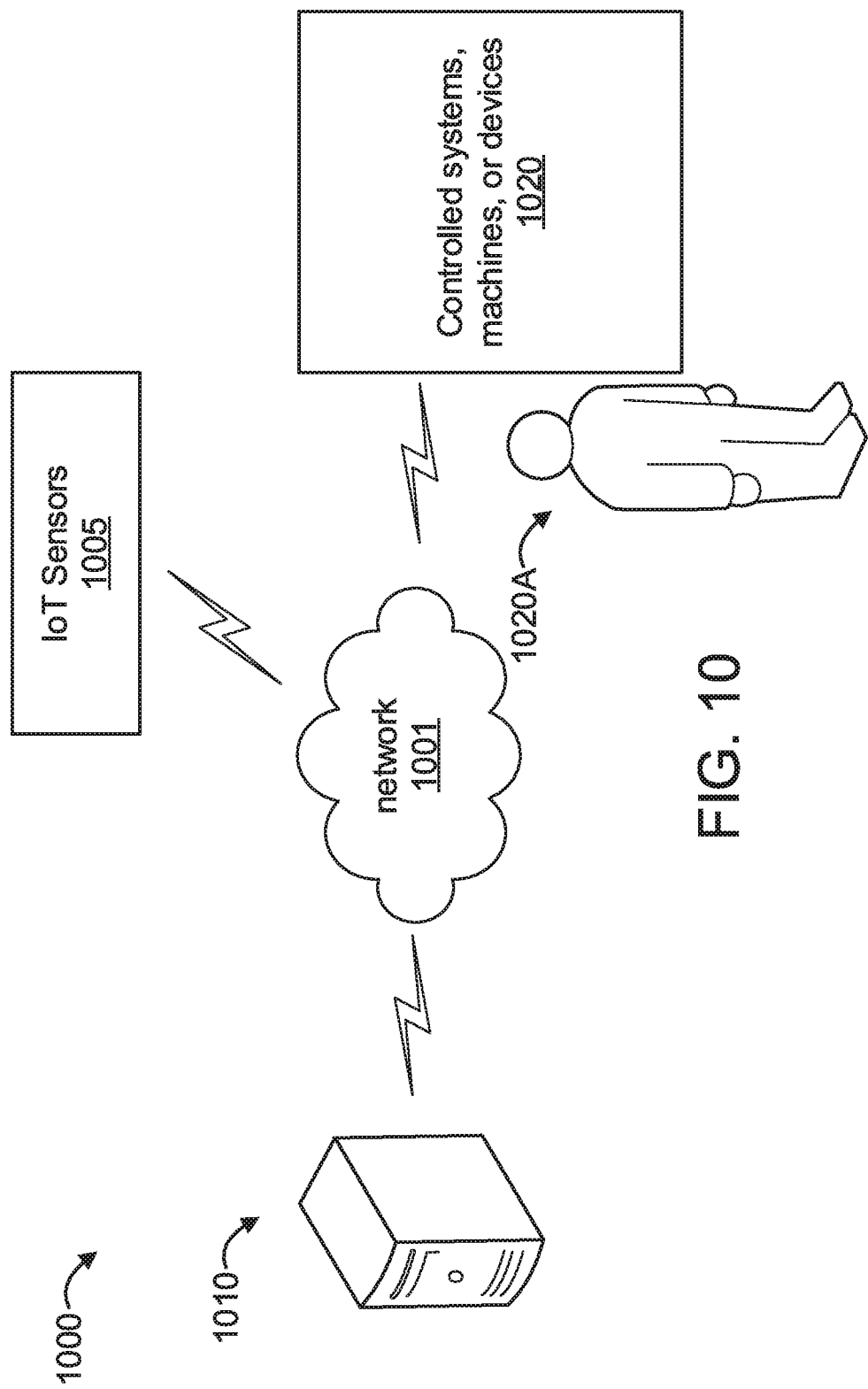
FIG. 10 shows a block diagram of an exemplary environment to which the present invention can be applied, in accordance with an embodiment of the present invention.

FIG. 10 shows a block diagram of an exemplary environment 1000 to which the present invention can be applied, in accordance with an embodiment of the present invention. The environment 1000 is representative of a computer network to which the present invention can be applied. The elements shown relative to FIG. 10 are set forth for the sake of illustration. However, it is to be appreciated that the present invention can be applied to other network configurations and other operational environments as readily contemplated by one of ordinary skill in the art given the teachings of the present invention provided herein, while maintaining the spirit of the present invention.

The environment 1000 at least includes at least one IoT system 1005, at least one computer processing system 1010, at least one controlled system(s), machine(s), and/or device(s) (individually and collectively denoted by the reference numeral 1020 and hereinafter referred to as "controlled system, machine, and/or device"). For the sake of simplicity and illustration, the preceding elements are shown in singular form, but can be readily extended to more than one of any of the preceding elements as readily appreciated by one of ordinary skill in the art given the teachings of the present invention provided herein, while maintaining the spirit of the present invention. The computer processing system 1010 can be any type of computer processing system including, but not limited to, servers, desktops, laptops, tablets, smart phones, media playback devices, and so forth, depending upon the particular implementation. For the sake of illustration, the computer processing system 1010 is a server.

The at least one IoT system 1005 is configured to detect one or more fault events. The at least one IoT system 1005 sends heterogeneous logs related to the detected fault events to the controlled system, machine, and/or device 1020 to be reviewed and edited by the user 1020A. The users 1020A makes an edit to a heterogeneous log from the at least one IoT system 1005. The edited heterogeneous log can be used to control the controlled system, machine, and/or device 1020 or another device. The computer processing system 1010 receives the heterogeneous logs from the at least one IoT system 1005 and the edited log from the user 1020A. The computer processing system 1010 can contain the heterogenous log pattern editing recommendation system 100. The heterogenous log pattern editing recommendation system 100 analyzes the heterogeneous logs from the at least one IoT System and the edited log from the user 1020A. The heterogenous log pattern editing recommendation system 100 generates recommended edits for other heterogeneous logs based on the edited log from the user 1020A. The recommended edits to heterogeneous logs can be used to control the controlled system, machine, and/or device 1020 or another device. The computer processing system 1010 sends the recommended heterogenous logs pattern edits to the user 1020A at the controlled system, machine, and/or device 1020 to accept and implement on the controlled system, machine, and/or device 1020. The user 1020A can configure the controlled system, machine, and/or device 1020 to auto-implement the recommended heterogenous logs pattern edits generated by the heterogenous log pattern editing recommendation system 100, thus controlling the controlled system, machine, and/or device 1020 or another device with the edited heterogeneous logs. The control can be adjusting a fan speed or orientation based on a temperature sensor, adjusting a processor multiplier based on a current sensor, disabling a computer system or sectors of memory in the computer system as a quarantine measure based on input from a security device, or locking a security door based on input from a camera or motion sensor.

In the embodiment shown in FIG. 10, the elements thereof are interconnected by a network(s) 1001. However, in other embodiments, other types of connections (e.g., wired, etc.) can also be used. Additionally, one or more elements in FIG. 10 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

Referring to FIG. 11, a flow chart for a computer implemented method 1000 performed in a network having network devices, including computers, that generate heterogeneous logs is illustratively shown, in accordance with an embodiment of the present invention. In block 1110, identify, from the heterogeneous logs, patterns comprising variable fields and constant fields. In block 1120, extract a category feature, a cardinality feature, and a before-after n-gram feature by tokenizing the variable fields in the identified patterns. In block 1130, generate target similarity scores between target fields to be potentially edited and other fields from among the variable fields in the heterogeneous logs using pattern editing operations based on the extracted category feature, the extracted cardinality feature, and the extracted before-after n-gram feature. In block 1140, recommend, to a user, log pattern edits for at least one of the target fields based on the target similarity scores between the target fields in the heterogeneous logs.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented heterogeneous log pattern editing recommendation method performed in a network having network devices that generate heterogeneous logs, the method comprising:

identifying, by a processor from the heterogeneous logs, patterns comprising variable fields and constant fields;

extracting, by the processor, a category feature, a cardinality feature, and a before-after n-gram feature by tokenizing the variable fields in the identified patterns;

generating, by the processor, target similarity scores between target fields to be potentially edited and other fields from among the variable fields in the heterogeneous logs using pattern editing operations based on the extracted category feature, the extracted cardinality feature, and the extracted before-after n-gram feature using a combined field similarity matrix $\Theta_{comb}$ generated by fusing a plurality of similarity matrices by:

$$\Theta_{comb}=\Theta_{category}\odot(\alpha*\Theta_{cardinality}+(1-\alpha)*\Theta_{before-after-n-grams}),$$

where $\Theta_{category}$ is a category similarity matrix, $\Theta_{cardinality}$ is a cardinality similarity matrix, and $\Theta_{before-after-n-grams}$ is a before-after n-grams similarity matrix for fields in the patterns, $\alpha$ is a contribution parameter using to balance the weights of similarity matrices generated from cardinality and before-after n-grams, and $\odot$ is the element-wise matrix multiplication;

wherein the category similarity matrix includes a category similarity score determined for groupings of the target fields, and wherein the category similarity score has a first value responsive to the target fields in a particular one of the groupings belonging to a same category and a second value responsive to the target fields in the particular one of the groupings belonging to different categories, and wherein the category similarity score is used in the category similarity matrix to generate the combined field similarity matrix; and recommending, by the processor to a user, log pattern edits for at least one of the target fields based on the target similarity scores between the target fields in the heterogeneous logs; and auto-implementing recommended log pattern edits; and controlling one or more systems, machines, or devices in the network using the auto-implemented recommended log pattern edits.

2. The computer-implemented method of claim 1, wherein the tokenized variable fields are based on a delimiter.

3. The computer-implemented method of claim 1, wherein the category feature is selected from the group consisting of only numbers, only non-space characters, an internet protocol address, only letters, and date and time information.

4. The computer-implemented method of claim 1, wherein the cardinality feature is a total number of unique values in one of the variable fields across the heterogeneous logs.

5. The computer-implemented method of claim 1, wherein the before-after n-gram feature is determined by:
   locating one of the target fields;
   extracting before n-grams tokens and after n-grams tokens for fields adjacent to the one of the target fields; and
   concatenating the extracted before n-grams tokens and the extracted after n-grams tokens into a string.

6. The computer-implemented method of claim 1, further comprises performing, by the processor, the recommended log pattern edits on the identified patterns after confirmation by the user.

7. The computer-implemented method of claim 1, wherein the pattern editing operations include variable-level operations, wherein the variable-level operations generate the combined field similarity matrix by fusing the category similarity matrix, the cardinality similarity matrix, and the before-after n-gram similarity matrix, wherein the combined field similarity matrix is used to generate the target similarity scores.

8. The computer-implemented method of claim 7, wherein the cardinality similarity matrix includes a cardinality similarity score determined for groupings of the target fields, wherein the cardinality similarity score for a particular on of the groupings is determined by a quantity subtracted from one, wherein the quantity is a normalized difference of cardinalities of the target fields in the particular one of the groupings, and wherein the cardinality similarity score is used in the cardinality similarity matrix to generate the combined field similarity matrix.

9. The computer-implemented method of claim 7, wherein the before-after n-gram similarity matrix includes a respective before-after similarity score determined for each of groupings of the target fields, wherein the before-after similarity score for a given one of the groupings of the target fields is determined by a quantity subtracted from one, wherein the quantity is an edit difference between the before-after n-gram features of the target fields in the given one of the groupings, and wherein the respective before-after similarity score is used in the before-after n-gram similarity matrix to generate the combined field similarity matrix.

10. The computer-implemented method of claim 1, wherein the pattern editing operations include constant-level operations, wherein the constant-level operations include a merge operation, and wherein the merge operation calculates a merge similarity score between various ones of the constant fields the user designates to merge and various other ones of the constant fields in the patterns, and wherein the merge similarity score is determined by an edit distance between the various ones of the constant fields the user designates to merge and the various other ones of the constant fields in the patterns, and wherein the merge similarity score is used to generate the target similarity scores.

11. The computer-implemented method of claim 1, wherein the pattern editing operations include constant-level operations, wherein the constant-level operations include a generalization operation, and wherein the generalization operation calculates a generalization similarity score between various ones of the constant fields the user designates and various other ones of the constant fields in the patterns, and wherein the generalization similarity score is determined by a quantity subtracted from one, wherein the quantity is an edit distance normalized by dividing the before-after n-gram features of the various other ones of the constant fields in the patterns by a maximum number of characters between the before-after n-gram features of the various ones of the constant fields the user designates, wherein the generalization similarity score is used to generate the target similarity scores.

12. The computer-implemented method of claim 1, wherein the pattern editing operations include pattern-level operations, wherein the pattern-level operations calculate a pattern similarity matrix between patterns, wherein the pattern similarity matrix being a total number of pairs of tokens with a same type in a same position in each of the patterns, and wherein the pattern similarity matrix is used to generate the target similarity scores.

13. A non-transitory article of manufacture tangibly embodying a computer readable program for heterogeneous log pattern editing recommendation performed in a network having network devices that generate heterogeneous logs, which when executed causes a computer to:
   identify, by a processor from the heterogeneous logs, patterns comprising variable fields and constant fields;
   extract, by the processor, a category feature, a cardinality feature, and a before-after n-gram feature by tokenizing the variable fields in the identified patterns;
   generate, by the processor, target similarity scores between target fields to be potentially edited and other fields from among the variable fields in the heterogeneous logs using pattern editing operations based on the extracted category feature, the extracted cardinality feature, and the extracted before-after n-gram feature using a combined field similarity matrix $\Theta_{comb}$ generated by fusing a plurality of similarity matrices by:

$$\Theta_{comb} = \Theta_{category} \odot (\alpha * \Theta_{cardinality} + (1-\alpha) * \Theta_{before-after-n-grams}),$$

where $\Theta_{category}$ is a category similarity matrix, $\Theta_{cardinality}$ is a cardinality similarity matrix, and $\Theta_{before-after-n-grams}$ is a before-after n-grams similarity matrix for fields in the patterns, $\alpha$ is a contribution parameter using to balance the weights of similarity matrices generated from cardinality and before-after n-grams, and $\odot$ is the element-wise matrix multiplication;
   wherein the category similarity matrix includes a category similarity score determined for groupings of the target fields, and wherein the category similarity score has a first value responsive to the target fields in a particular one of the groupings belonging to a same category and a second value responsive to the target fields in the particular one of the groupings belonging to different categories, and wherein the category similarity score is used in the category similarity matrix to generate the combined field similarity matrix; and
   recommend, by the processor to a user, log pattern edits for at least one of the target fields based on the target similarity scores between the target fields in the heterogeneous logs; and
   auto-implement recommended log pattern edits; and
   control one or more systems, machines, or devices in the network using the auto-implemented recommended log pattern edits.

14. A heterogeneous log pattern editing recommendation system deployed in a network having network devices that generate heterogeneous logs, the system comprising:
   a server having a processor configured to:
      identify, from the heterogeneous logs, patterns comprising variable fields and constant fields;
      extract a category feature, a cardinality feature, and a before-after n-gram feature by tokenizing the variable fields in the identified patterns;
      generate target similarity scores between target fields to be potentially edited and other fields from among the variable fields in the heterogeneous logs using pattern editing operations based on the extracted category feature, the extracted cardinality feature, and the extracted before-after n-gram feature using a combined field similarity matrix $\Theta_{comb}$ generated by fusing a plurality of similarity matrices by:

$$\Theta_{comb} = \Theta_{category} \odot (\alpha * \Theta_{cardinality} + (1-\alpha) * \Theta_{before-after-n-grams}),$$

where $\Theta_{category}$ is a category similarity matrix, $\Theta_{cardinality}$ is a cardinality similarity matrix, and $\Theta_{before-after-n-grams}$ is a before-after n-grams similarity matrix for fields in the patterns, $\alpha$ is a contribution parameter using to balance the weights of similarity matrices generated from cardinality and before-after n-grams, and $\odot$ is the element-wise matrix multiplication;

wherein the category similarity matrix includes a category similarity score determined for groupings of the target fields, and wherein the category similarity score has a first value responsive to the target fields in a particular one of the groupings belonging to a same category and a second value responsive to the target fields in the particular one of the groupings belonging to different categories, and wherein the category similarity score is used in the category similarity matrix to generate the combined field similarity matrix; and recommend, by the processor to a user, log pattern edits for at least one of the target fields based on the target similarity scores between the target fields in the heterogeneous logs; and auto-implement recommended log pattern edits; and control one or more systems, machines, or devices in the network using the auto-implemented recommended log pattern edits.

15. The system of claim 14, wherein the processor is further configured to perform the recommended log pattern edits on the identified patterns after confirmation by the user.

16. The system of claim 14, wherein the category feature is selected from the group consisting of only numbers, only non-space characters, an internet protocol address, only letters, and date and time information.

17. The system of claim 14, wherein the cardinality feature is a total number of unique values in one of the variable fields across the heterogeneous logs.

18. The system of claim 14, wherein the tokenized variable fields are based on a delimiter.

* * * * *